(12) United States Patent
Wetsel et al.

(10) Patent No.: US 12,093,440 B2
(45) Date of Patent: Sep. 17, 2024

(54) DIRECTION OF USER INPUT TO VIRTUAL OBJECTS BASED ON COMMAND METADATA

(71) Applicant: Lenovo (Singapore) Pte. Ltd., Singapore (SG)

(72) Inventors: Peter Wetsel, Apex, NC (US); Alec Hoffman, Morrisville, NC (US); Mayan Shay May-Raz, Morrisville, NC (US); Andrew Hansen, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 244 days.

(21) Appl. No.: 17/709,946

(22) Filed: Mar. 31, 2022

(65) Prior Publication Data

US 2023/0315193 A1    Oct. 5, 2023

(51) Int. Cl.
*G06F 3/01*    (2006.01)
*G06T 19/00*    (2011.01)
(52) U.S. Cl.
CPC ............ *G06F 3/011* (2013.01); *G06T 19/006* (2013.01)

(58) Field of Classification Search
CPC .............................. G06F 3/011; G06T 19/006
See application file for complete search history.

(56) References Cited

U.S. PATENT DOCUMENTS

| | | | |
|---|---|---|---|
| 2018/0150204 A1* | 5/2018 | Macgillivray | G06F 3/04815 |
| 2019/0019508 A1* | 1/2019 | Rochford | G06F 3/013 |
| 2019/0377487 A1* | 12/2019 | Bailey | G06F 1/163 |
| 2020/0225747 A1* | 7/2020 | Bar-Zeev | G06F 3/04842 |
| 2020/0409532 A1* | 12/2020 | Murphy | G02B 27/017 |
| 2022/0171453 A1* | 6/2022 | Powderly | G06T 19/006 |

* cited by examiner

*Primary Examiner* — Terrell M Robinson
(74) *Attorney, Agent, or Firm* — John M. Rogitz; John L. Rogitz

(57) ABSTRACT

In one aspect, a device includes a processor and storage accessible to the processor. The storage includes instructions executable by the processor to receive input from a user. The instructions are also executable to determine to which of first and second virtual objects to direct the input based on metadata for the first and second virtual objects indicating respective commands related to the first and second virtual objects.

20 Claims, 6 Drawing Sheets

DIRECTION OF USER INPUT TO VIRTUAL OBJECTS BASED ON COMMAND METADATA

FIELD

The disclosure below relates to technically inventive, non-routine solutions that are necessarily rooted in computer technology and that produce concrete technical improvements. In particular, the disclosure below relates to direction of user input to virtual objects based on command metadata for the virtual objects.

BACKGROUND

As recognized herein, in virtual reality (VR) and other digital environments, the electronic device typically directs user commands to the nearest virtual object regardless of whether that virtual object can actually support the command. This in turn can lead to the command being dropped, with the result being nothing happening pursuant to the user command. As also recognized herein, even where a pointer or eye gaze is used to indicate an intended virtual object, this is not always practical or effective as virtual objects are often presented very close together in VR (or might even overlap each other), making it difficult or impossible to select the intended object. There are currently no adequate solutions to the foregoing computer-related, technological problems.

SUMMARY

Accordingly, in one aspect a headset includes at least one processor, a display accessible to the at least one processor, and storage accessible to the at least one processor. The storage includes instructions executable by the at least one processor to present first and second virtual objects on the display, receive input from a user, and access first metadata related to the first virtual object. The first metadata indicates a first command that relates to the first virtual object. Based on the first metadata, the instructions are executable to determine whether to direct the input to the first virtual object. Based on determining to direct the input to the first virtual object, the instructions are executable to direct the input to the first virtual object to execute the first command. Based on determining to not direct the input to the first virtual object, the instructions are executable to access second metadata related to the second virtual object. The second metadata indicates a second command that relates to the second virtual object. Based on the second metadata, the instructions are executable to determine whether to direct the input to the second virtual object. Based on determining to direct the input to the second virtual object, the instructions are executable to direct the input to the second virtual object to execute the second command.

In various examples, the first and second virtual objects may be three-dimensional (3D) objects presented, via the display, in virtual reality space, augmented reality space, and/or mixed reality space.

Also in various example implementations, the first metadata and the second metadata may be accessed based on the first and second objects being one or both of within a current field of view of a wearer of the headset, and within a threshold virtual distance of the headset.

Still further, in some example embodiments the input may include a voice command. The voice command may include a command to scroll a web browser, where the web browser may establish one of the first and second virtual objects.

Additionally, in some example embodiments the first metadata and the second metadata may be accessed based on the user being identified by the headset as not looking at either of the first and second virtual objects. Additionally or alternatively, the second metadata may be accessed despite the user being identified by the headset as looking at the first virtual object.

In another aspect, a method includes receiving input from a user at a device and accessing first data related to a first virtual object presented on a display. The first data indicates a first command that relates to the first virtual object. Based on the first data, the method includes determining whether to direct the input to the first virtual object. Based on determining to direct the input to the first virtual object, the method includes directing the input to the first virtual object to execute the first command. Based on determining to not direct the input to the first virtual object, the method includes accessing second data related to a second virtual object. The second data indicates a second command that relates to the second virtual object. Based on the second data, the method includes determining whether to direct the input to the second virtual object. Based on determining to direct the input to the second virtual object, the method includes directing the input to the second virtual object to execute the second command.

In various example embodiments, the display may be a handset display or a headset display.

Also in some example embodiments, the method may include accessing third data for a third virtual object based on determining that the input should not be directed to either of the first and second virtual objects. The third data may indicate a third command that relates to the third virtual object. Based on the third data, the method may include determining to direct the input to the third virtual object. Responsive to determining to direct the input to the third virtual object, the method may include directing the input to the third virtual object to execute the third command. In some specific examples, the third data may be accessed based on the third virtual object being, within virtual space, a next-closest virtual object to the user after the first and second virtual objects. Also, the first, second, and third commands may be different from each other.

Additionally, in some example implementations the first and second virtual objects may be three-dimensional (3D) objects. Also in some example implementations, the first data and the second data may be accessed based on the first and second objects being both within a current field of view of a user and within a threshold virtual distance of the user.

In another aspect, at least one computer readable storage medium (CRSM) that is not a transitory signal includes instructions executable by at least one processor to receive input from a user and access first data related to a first virtual object. The first data indicates a first command that relates to the first virtual object. Based on the first data, the instructions are executable to determine whether to direct the input to the first virtual object. Based on determining to direct the input to the first virtual object, the instructions are executable to direct the input to the first virtual object to execute the first command. Based on determining to not direct the input to the first virtual object, the instructions are executable to access second data related to a second virtual object. The second data indicates a second command that relates to the second virtual object. Based on the second data, the instructions are executable to determine whether to direct the input to the second virtual object. Based on determining to direct the input to the second virtual object, the instructions are executable to direct the input to the second virtual object to execute the second command.

In some examples, the first data may be accessed based on the first virtual object being a nearest virtual object to the user within virtual space that is within the user's field of view. Additionally, if desired the second data may be accessed based on the second virtual object being both a next-nearest virtual object to the user within virtual space and within the user's field of view.

The details of present principles, both as to their structure and operation, can best be understood in reference to the accompanying drawings, in which like reference numerals refer to like parts, and in which:

DETAILED DESCRIPTION

Figure 1:
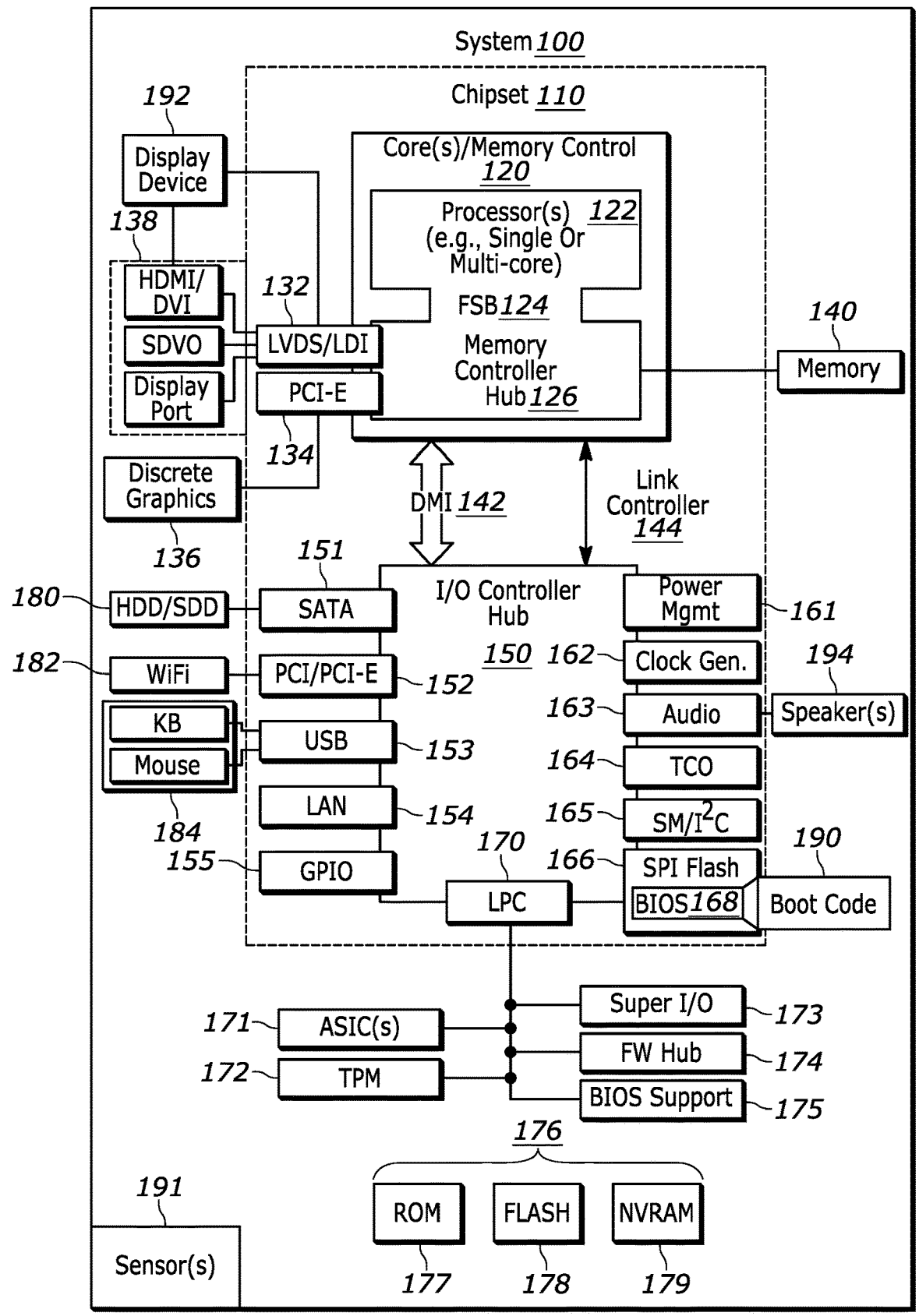
FIG. 1 is a block diagram of an example system consistent with present principles.

Among other things, the detailed description below discusses augmented, mixed, and virtual reality presentations where some or all virtual objects within the environment may have preset metadata specifying which commands those objects support (e.g., as preset by a software developer or device manufacturer, for example). When a voice command is recognized by the device, the device may look for the closest object to the user's center of gaze. In some specific example implementations, the search might be limited to only objects within the user's field of view (FOV) and within a set distance (e.g., so as to remove all objects from consideration that are not adequately viewable by the user).

Then when an appropriate object is found within the user's FOV and set distance, the device may perform a check to determine if that object supports the uttered command. If that object's metadata reveals that it does support the command, then the search is over and the device may send the command to that object. However, if that object does not support the command, then the search may expand outward to the next-closest object (possibly in all directions forming a sphere-shaped search area, notwithstanding the user's current FOV), and may then perform the same type of check for the next object. This process may repeat until either an object is found that supports the command (at which point the command may be sent to that object), or until every object in the user's FOV or area has been searched.

Prior to delving further into the details of the instant techniques, note with respect to any computer systems discussed herein that a system may include server and client components, connected over a network such that data may be exchanged between the client and server components.

The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, a camera might be on a headset being worn by a user so that the system 100 may execute computer vision and/or simultaneous localization and mapping (SLAM) using images from the camera consistent with present principles.

In addition to or in lieu of the foregoing, the sensors 191 may include one or more inertial measurement sensors that might be included in an inertial measurement unit (IMU) for location tracking (e.g., dead reckoning). For example, the system 100 may be embodied in a headset and the inertial measurement sensors may be located on the headset. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone as a voice command as described herein. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
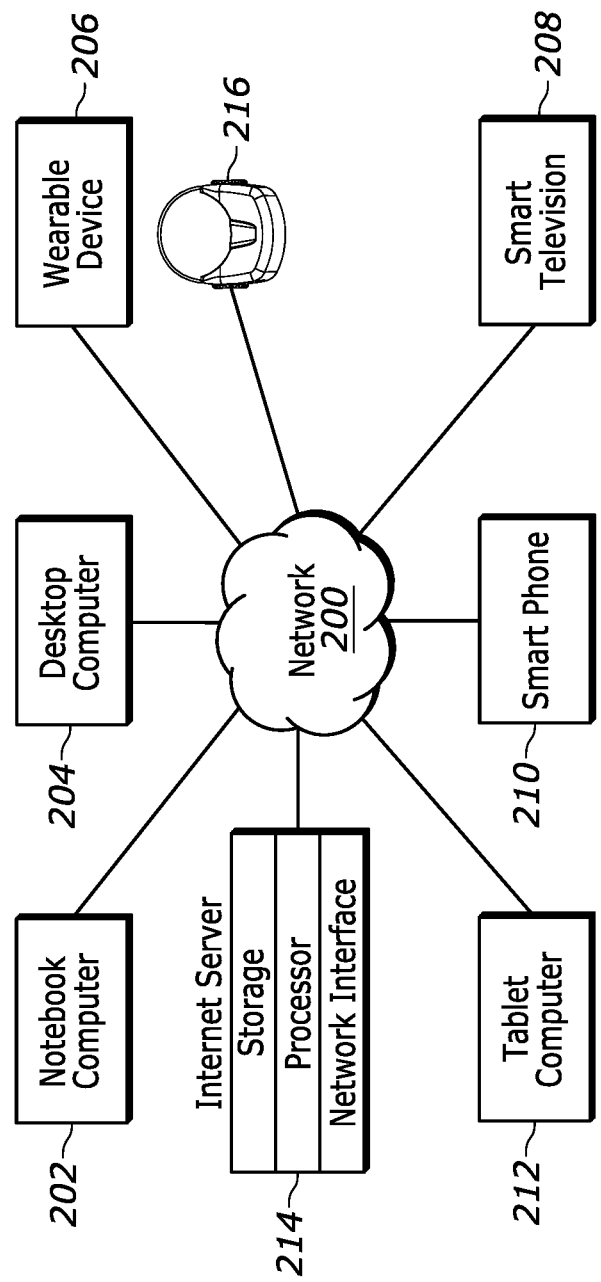
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
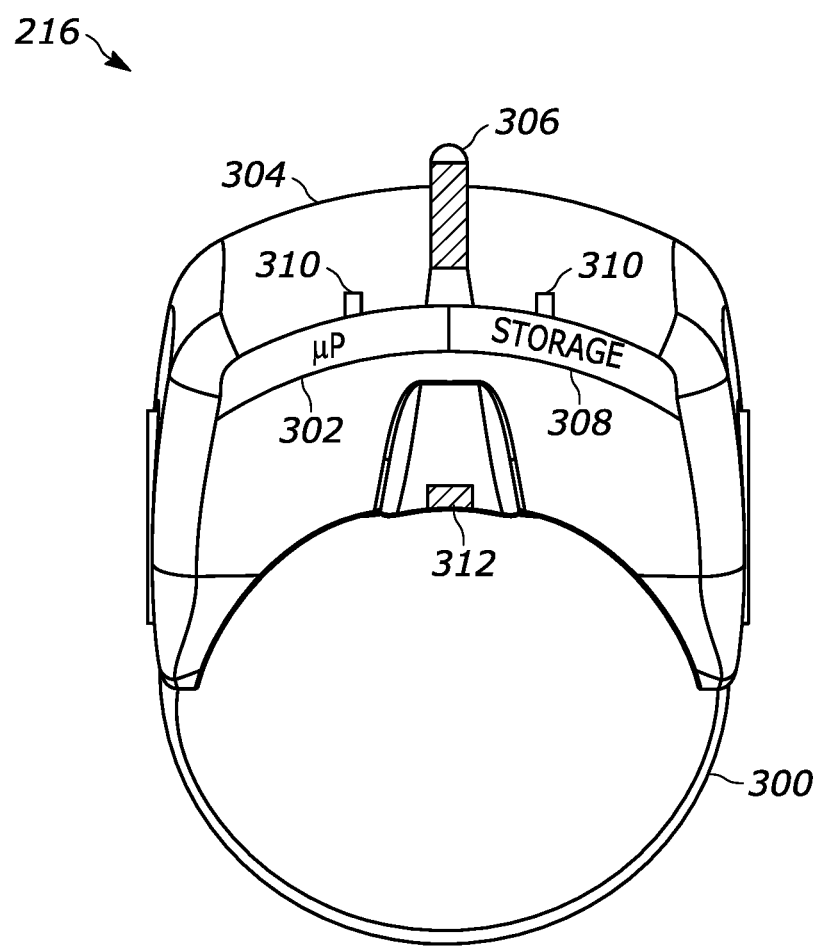
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. However, further note that the camera(s) 306 may be located at other headset locations as well. Further note that in some examples, inward-facing cameras 310 may also be mounted within the headset 216 and oriented to image the user's eyes for eye tracking while the user wears the headset 216.

Additionally, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content.

Also note here that while FIG. 3 shows a headset, handsets such as smartphones and tablet computers may also be used for AR, MR, and VR applications as discussed herein to present virtual objects on the handset's display and direct voice commands to one of the virtual objects based on command metadata as described further below. But further note that laptops and other types of computing devices may also be used.

Figure 4:
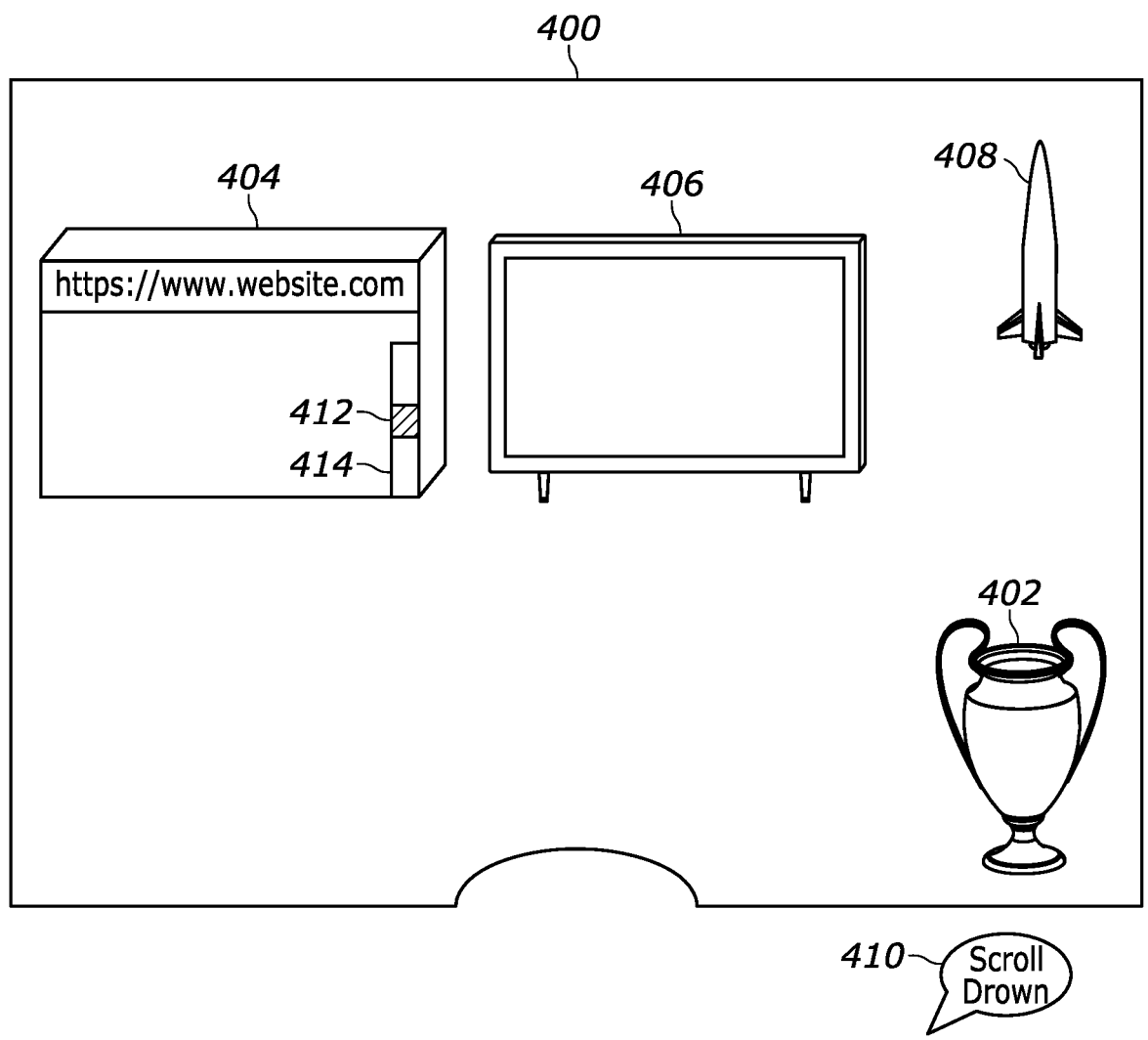
FIG. 4 shows an example field of view (FOV) of a user while wearing a headset to view an AR, MR, or VR presentation consistent with present principles.

Now in reference to FIG. 4, suppose an end-user is wearing a headset to engage in an AR, VR, or MR experience. The headset's display may therefore be transparent for AR and MR applications, or may be non-transparent for VR applications or AR/MR applications where a camera feed of the user's forward-facing field of view (FOV) of his/her real-world surroundings is presented on the non-transparent display along with virtual objects.

According to the present example, assume a VR experience in the metaverse where a current FOV 400 of the end-user within the virtual environment is shown. FIG. 4 also shows that a three-dimensional (3D) virtual trophy 402 is being presented to the user. The user might have been awarded the trophy 402 for beating other players in a video game or game in the metaverse, for example.

Also shown within the FOV 400 is a 3D web browser 404 and 3D virtual TV 406. The browser 404 and TV 406 may both be controllable by voice command, gesture command, etc. to perform various functions, such as browsing the Internet via the browser 404 and flipping through TV channels or streaming audio/video content through the TV 406. Also within the FOV 400 is a 3D virtual rocket 408 that the user may control to blast off and out of the FOV 400.

It is to be understood in reference to FIG. 4 that, from the current virtual geolocation of the user within the virtual space of the metaverse (or other VR experience), the trophy 402 is most-proximate to the user at a first distance. The browser 404 and TV 406 may be the next nearest objects to the user, both at a second distance. The rocket 408 may be the farthest from the user at a third distance, but further note that in some examples the rocket 408 may still be within a threshold maximum virtual distance from the user to still execute a command based on being within the threshold maximum distance.

As an example consistent with present principles, assume the headset is performing eye tracking to track the user's eyes and detects, while the user is determined to not be looking at any of the four virtual objects 402-408, that the user has provided a voice command detected at the headset's microphone to "scroll down" (as indicated by speech bubble 410). Based on this command, the headset may access (or at least attempt to access) first command metadata for the nearest virtual object to the user's current location in virtual space and/or for the nearest virtual object to the axis of the user's current center of gaze, which in either case is the trophy 402 in this example. However, also per this example, assume that no command metadata is available for the trophy 402 or that the first command metadata indicates that no commands are available for the user to control of the trophy 402.

In response to identifying as much, the headset may proceed to the next-nearest objects to the user within virtual space (and/or relative the user's current gaze axis), which in this example is the browser 404 and TV 406. Responsive to identifying those two objects as the next most-near virtual objects to the user (and, in some examples, also determining that they are within the user's FOV and within the maximum threshold distance), the headset may access second command metadata for the browser 404 and third command metadata for the TV 406. The headset may then identify, as indicated in the second and third metadata, respective commands that the objects 404, 406 support for the user to control them within the VR experience.

In the present instance, commands for the browser 404 may include a back command to return to a previous web page, a forward command to go forward to another web page, and scroll up and down commands to scroll a cursor/slider 412 along a vertical scroll bar 414. Commands for the TV 406 may include volume up/down commands, TV channel up/down commands, and a select command to select content for streaming.

Accordingly, based on the respective metadata for the two objects 404, 406 indicating their respective commands, and based on those two objects being the next-nearest to the user/user's gaze within the user's current FOV in virtual space, the headset may determine which metadata command matches or supports the user's command. In the present example, the headset may therefore determine that the TV 406 has not been enabled for scroll commands while the browser 404 has been so-enabled, and so the headset may direct the user's voice input of the scroll command to the browser 404, with the headset then controlling the slider 412 to scroll down on the website currently presented in the browser 404 itself according to the voice command (e.g., to scroll down by a preset increment or until the user says "stop").

However, to further illustrate present principles, suppose the user command was "blast off" rather than "scroll down". Upon accessing the second and third metadata for the objects 404, 406, the headset may determine that the blast off command does not correlate to any available commands for the objects 404, 406. In such a situation, the headset may then identify a next most-proximate object to the user within virtual space, which in this case would be the rocket 408. The headset may then access fourth metadata for the rocket 408 to identify that the rocket 408 does in fact support a "blast off" command, and therefore direct the voice input to the rocket 408. The headset may then execute the blast off command by virtually animating the rocket 408 to blast off up and out of the user's FOV 400.

As for the first, second, third, and fourth metadata itself, note that the metadata may have been loaded into RAM with the VR experience as part of the VR experience, and therefore may be accessible by the headset in the RAM. Additionally or alternatively, the metadata may be otherwise accessible to the headset, such as being stored in persistent local hard disk drive storage on the headset or even at a remotely-located cloud storage server to which the headset has access.

Figure 5:
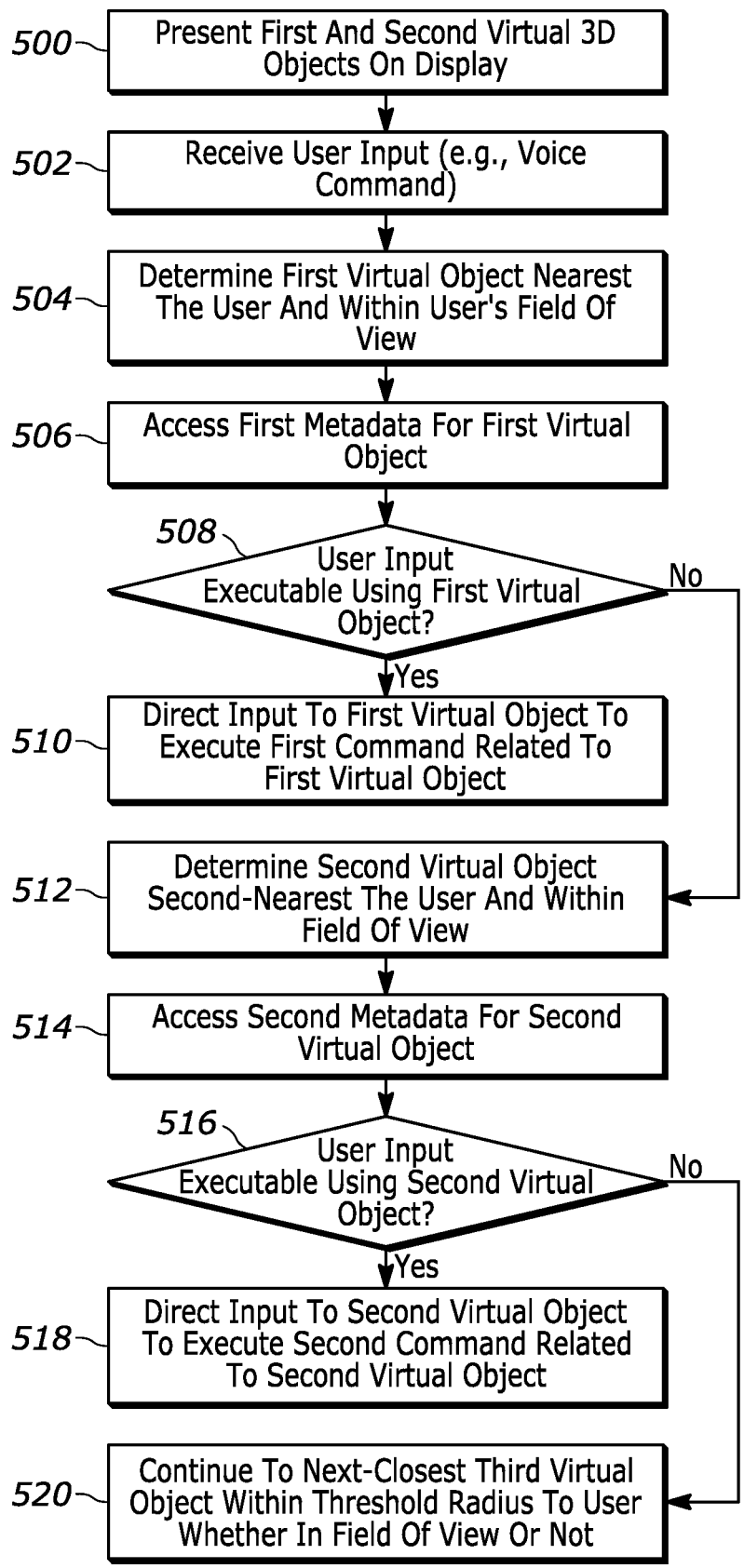
FIG. 5 shows example logic in example flow chart format that may be executed by a device consistent with present principles.

Continuing the detailed description in reference to FIG. 5, it shows example logic that may be executed by handset, headset, and/or remotely-located server in any appropriate combination consistent with present principles. Note that while the logic of FIG. 5 is shown in flow chart format, other suitable logic may also be used.

Beginning at block 500, the device may begin presenting an AR, MR, or VR experience to a user and, in the process, present first and second virtual objects on a client device display, such as a headset display or smartphone display. Note that this may occur after, for example, the device executes simultaneous localization and mapping (SLAM) using cameras on the device to spatially map in 3D the real-world room or other area in which the device is currently disposed (e.g., for AR and MR implementations where the virtual objects may be virtually anchored to real-world locations).

In any case, from block 500 the logic may proceed to block 502. At block 502 the device may receive input from an end-user, such as a voice command (e.g., a voice command to scroll a web browser as described above). However, further note that other types of user input might also be received, such as a gesture command detected using images from one of the device's cameras and gesture recognition. For example, to provide a scroll up command according to the example of FIG. 4 above, the user might hold his/her right hand out in the air with the user's right index finger extended to then flick the index finger from down to up in the air, which the device may then recognize as a scroll up command.

Then responsive to receipt of the user command, the logic may proceed to block 504 where the device may determine a first virtual object that is nearest the user within virtual space, and that is also within the user's field of view and possibly within a threshold maximum virtual distance to the user as also described above. Additionally or alternatively, at block 504 the device may select the first virtual object based on the first virtual object being the nearest to the axis of the user's current center of gaze (e.g., as determined using eye tracking). Or, if two or more objects satisfy the criteria in the penultimate sentence, the device may select the one that is currently nearest to the user's center of gaze. Then responsive to identifying the first virtual object that is nearest the user, the logic may proceed to block 506.

At block 506 the device may access first metadata related to the first virtual object, where the first metadata may indicate at least a first command that relates to the first virtual object. The logic may then proceed to decision diamond 508 where the device may determine, based on the first metadata, whether to direct the input to the first virtual object (e.g., determine whether the user input is executable using first virtual object or determine whether the first virtual object otherwise supports execution of the command).

Then, responsive to determining to direct the input to the first virtual object, the device may direct the input to the first virtual object for the device to then execute the first command using the first virtual object as shown at block 510 of FIG. 5. However, based on determining to not direct the input to the first virtual object (e.g., the first virtual object does not support execution of the command indicated in the user's voice input), the logic may proceed to block 512.

At block 512 the device may determine that the second virtual object is a second-nearest object to the user while still being within the user's FOV and maximum threshold distance (and/or is the second-nearest object to the axis of the user's current center of gaze). Responsive to this determination, the logic may then proceed to block 514 where the device may access second metadata related to the second virtual object, where the second metadata may indicate at least a second command that relates to the second virtual object.

Responsive to accessing the second metadata, the logic may then proceed to decision diamond 516. At diamond 516 the device may determine, based on the second metadata, whether to direct the input to the second virtual object. Responsive to determining to direct the input to the second virtual object, the logic may proceed to block 518 where the device may direct the input to the second virtual object for the device to then execute the second command using the second virtual object. However, based on determining to not direct the input to the second virtual object, the logic may proceed to block 520.

At block 520 the device may continue on, based on determining that the user input should not be directed to either of the first and second virtual objects, to identifying a next-closest third virtual object (within the virtual space) that might still be within threshold maximum distance to the user. However, at this point the third virtual object need not be within the user's current FOV in various example implementations in order for the device to continue expanding its search outward from the user to identify a most-proximate virtual object at which the user's voice command can be executed. Thus, as the search expands outward, the device may access the command metadata of the respective virtual object to determine whether to direct the user input to that virtual object and ultimately potentially execute the corresponding command if supported by that virtual object.

Before moving on from FIG. 5, note that in some examples the device executing the logic of FIG. 5 may access the first metadata and the second metadata based on the user being identified by the device (based on eye tracking) as not looking at either of the first and second virtual objects (e.g., looking past or to the side of each object). Thus, whereas eye tracking alone might not be sufficient to determine to which virtual object to direct the user input, the device may still identify an appropriate virtual object to which to direct the input by using present principles.

However, further note that in some examples, even if the device executes eye tracking to determine that the user is looking at the first virtual object, the second metadata for the second virtual object may be accessed despite the user being identified as looking at the first virtual object. This may be done since the first virtual object may not support the command and so directing the user's input to the first graphical object would not result in anything occurring, and thus the device may move past the first virtual object within the virtual space to determine whether a next-most-proximate virtual object to the user within the virtual space supports the user's command.

More generally, it may now be appreciated that by going from nearest first and then farther out according to the user's current gaze direction and/or current location within virtual space (all while also possibly initially only considering virtual objects one or both of within the user's current FOV and within the maximum threshold virtual distance to the user), device effectiveness and accuracy at appropriately executing the user's voice command may be increased. However, as intimated above, to further increase effectiveness in getting the command to the appropriate virtual object, if no objects within the current FOV and/or max threshold distance support the command, then the device may consider objects virtually outside the user's current FOV and/or max threshold distance, possibly starting again with the object nearest the user first and then incrementally working outward to identify the appropriate virtual object to which to direct the command.

Figure 6:
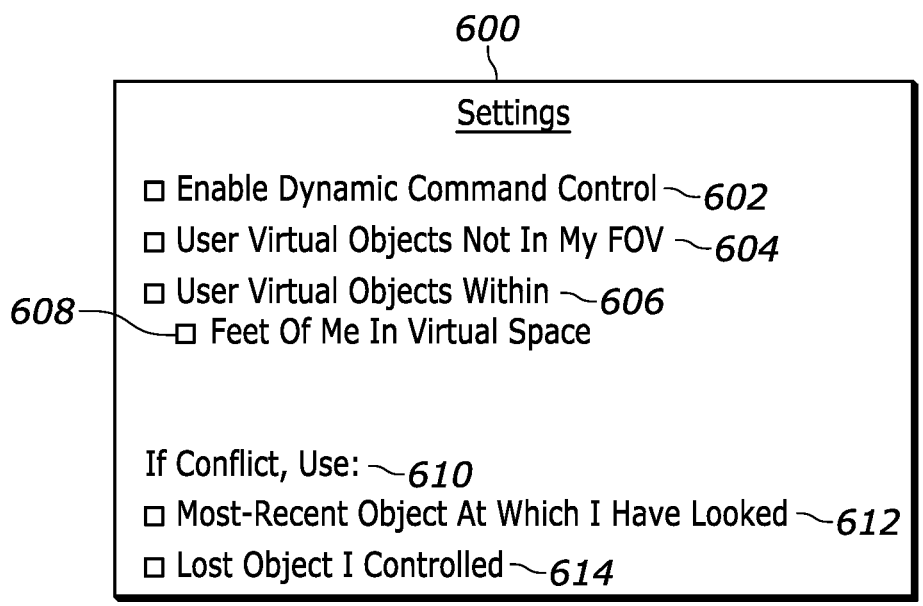
FIG. 6 shows an example GUI that may be presented on a display to configure one or more settings of a device/system to operate consistent with present principles.

Now in reference to FIG. 6, an example graphical user interface (GUI) 600 is shown that may be presented on the display of a device configured to undertake present principles in order to configure or enable one or more settings of that device to operate as described herein. For example, the GUI 600 may be presented on the display of a headset or handset configured to execute the logic of FIG. 5. The settings GUI 600 may therefore be reached by navigating an app menu or a settings menu of the device, for example. Also note that in the example shown, each option or sub-option discussed below may be selected by directing touch or cursor input to the respective check box adjacent to the respective option.

Accordingly, as shown in FIG. 6, the GUI 600 may include an option 602 that may be selectable a single time to set or configure the device, system, software, etc. to undertake present principles for multiple future AR/MR/VR simulations. For example, selection of the option 602 may configure the device to execute the logic of FIG. 5 for multiple different metaverse simulations.

As also shown in FIG. 6, the GUI 600 may include an option 604 that may be selectable to set or configure the device to consider virtual objects that are not within the user's current FOV (e.g., at all times or only after first considering virtual objects within the user's FOV) when determining where to direct user input.

FIG. 6 also shows that the GUI 600 may include an option 606 that may be selectable to specifically set or configure the device to only consider virtual objects within a maximum threshold virtual distance of the user within virtual space as described above when determining where to direct user input. Thus, the user may also use a hard or soft keyboard to direct numerical input to input box 608 to establish the max threshold virtual distance based on the end-user's preference. The max threshold virtual distance may then be used as a threshold radius for a virtual sphere within which virtual objects may be located/selected for executing virtual commands consistent with present principles. However, note that in other examples, areas of other shapes such as boxes may establish a threshold 3D virtual area within which virtual objects may be located/selected for executing a supported command.

In some examples, the GUI 600 may also include a setting 610 at which the end-user may set rules for which virtual object a command should be sent to when there is a conflict between two virtual objects that might both support the command (e.g., based on those objects also being the same virtual distance from the user and/or gaze direction). Accordingly, option 612 may be selected to set or configure the device to direct the command to the most-recent virtual object of the two at which the user looked prior to providing the command. Additionally or alternatively, the user may select the option 614 to set or configure the device to direct the command to the most-recent virtual object the user controlled with a prior command (before providing the current command subject to the object conflict).

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
   at least one processor;
   a display accessible to the at least one processor; and
   storage accessible to the at least one processor and comprising instructions executable by the at least one processor to:
   present, on the display, first and second virtual objects;
   receive input of a user command;
   access first metadata related to the first virtual object, the first metadata indicating whether the first virtual object supports the user command;
   based on the first metadata indicating that the first virtual object supports the user command, direct the user command to the first virtual object;
   based on the first metadata not indicating that the first virtual object supports the user command, access second metadata indicating whether the second virtual object supports the user command; and
   based on the second metadata indicating that the second virtual object supports the user command, direct the user command to the second virtual object;
   wherein the first metadata and the second metadata are accessed based on the first and second virtual objects being both within a current field of view of a wearer of the headset and within a threshold virtual distance of the headset.

2. The headset of claim 1, wherein the first and second virtual objects are three-dimensional (3D) objects presented, via the display, in virtual reality space.

3. The headset of claim 1, wherein the first and second virtual objects are three-dimensional (3D) objects presented, via the display, in one or more of: augmented reality space, mixed reality space.

4. The headset of claim 1, wherein the user command comprises a voice command.

5. The headset of claim 4, wherein the voice command comprises a command to scroll a web browser, the web browser establishing one of the first and second virtual objects.

6. The headset of claim 1, wherein the first metadata and the second metadata are accessed based on the wearer being identified by the headset as not looking at either of the first and second virtual objects.

7. The headset of claim 1, wherein the second metadata is accessed despite the wearer being identified by the headset as looking at the first virtual object.

8. A method, comprising:
   receiving, at a device, a user command;
   accessing first data related to a first virtual object presented on a display, the first data indicating whether the first virtual object supports the user command;
   based on the first data indicating that the first virtual object supports the user command, directing the user command to the first virtual object;
   based on the first data not indicating that the first virtual object supports the user command, accessing second data related to a second virtual object, the second data indicating whether the second virtual object supports the user command; and
   based on the second data indicating that the second virtual object supports the user command, directing the user command to the second virtual object;
   wherein the first data and the second data are accessed based on the first and second virtual objects being both within a current field of view of a user and within a threshold virtual distance of the user.

9. The method of claim 8, wherein the display is one or more of: a handset display, a headset display.

10. The method of claim 8, comprising:
    based on determining that the user command should not be directed to either of the first and second virtual objects, accessing third data for a third virtual object, the third data indicating whether the third virtual object supports the user command;
    based on the third data indicating that the third virtual object supports the user command, directing the user command to the third virtual object.

11. The method of claim 10, wherein the third data is accessed based on the third virtual object being, within virtual space, a next-closest virtual object to the user after the first and second virtual objects.

12. The method of claim 11, wherein the third data is accessed based on the third virtual object being outside the current field of view.

13. The method of claim 8, wherein the first and second virtual objects are three-dimensional (3D) objects.

14. The method of claim 8, wherein the first data and the second data are accessed based on the user being identified as not looking at either of the first and second virtual objects.

15. At least one computer readable storage medium (CRSM) that is not a transitory signal, the at least one computer readable storage medium comprising instructions executable by at least one processor to:
   receive a user command;
   access first data related to a first virtual object, the first data indicating whether the first virtual object supports the user command;
   based on the first data indicating that the first virtual object supports the user command, direct the user command to the first virtual object;
   based on the first data not indicating that the first virtual object supports the user command, access second data related to a second virtual object, the second data indicating whether the second virtual object supports the user command; and
   based on the second data indicating that the second virtual object supports the user command, direct the user command to the second virtual object;
   wherein the first data and the second data are accessed based on a user being identified as not looking at either of the first and second virtual objects.

16. The CRSM of claim 15, wherein the first data is accessed based on the first virtual object being a nearest virtual object to the user within virtual space that is within the user's field of view.

17. The CRSM of claim 16, wherein the second data is accessed based on the second virtual object being both: a next-nearest virtual object to the user within virtual space, and within the user's field of view.

18. The at least one CRSM of claim 15, wherein the first data and the second data are accessed based on the first and second virtual objects being within a current field of view of the user.

19. The at least one CRSM of claim 15, wherein the first data and the second data are accessed based on the first and second virtual objects being within a threshold virtual distance of a device being used by the user.

20. The at least one CRSM of claim 15, wherein the first data and the second data are accessed based on the first and second virtual objects being both within a current field of view of the user and within a threshold virtual distance of a device being used by the user.

* * * * *